(12) United States Patent
Rocken et al.

(10) Patent No.: US 6,356,232 B1
(45) Date of Patent: Mar. 12, 2002

(54) HIGH RESOLUTION IONOSPHERIC TECHNIQUE FOR REGIONAL AREA HIGH-ACCURACY GLOBAL POSITIONING SYSTEM APPLICATIONS

(75) Inventors: Christian Rocken; Randolph H. Ware; James M. Johnson; John J. Braun, all of Boulder; Christopher Alber, Eldora; Teresa M. Van Hove, Ft. Lupton, all of CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 09/722,857

(22) Filed: Nov. 27, 2000

Related U.S. Application Data (60) Provisional application No. 60/172,443, filed on Dec. 17, 1999.

(51) Int. Cl.$^7$ .............................................. H04B 7/185
(52) U.S. Cl. .................................................. 342/357.02
(58) Field of Search ....................... 342/357.01, 357.02, 342/463, 357.06

(56) References Cited

U.S. PATENT DOCUMENTS

| | | | |
|---|---|---|---|
| 5,323,322 A | | 6/1994 | Mueller et al. |
| 5,450,448 A | * | 9/1995 | Sheynblat .................... 375/346 |
| 5,621,646 A | | 4/1997 | Enge et al. |
| 5,786,733 A | | 7/1998 | Yamaguchi |
| 6,067,852 A | * | 5/2000 | Alber et al. ............... 73/178 R |

OTHER PUBLICATIONS

Lambert Wanninger, "Enhancing differential GPS using regional ionospheric error models," Bulletin Geodesique, p. 283–291, (Apr. 17, 1995).

Jock R.I. Christie, Ping–Ya Ko, Boris S. Pervan, Per K. Enge, J. David Powell, Bradford W. Parkinson, "Analytical and Experimental Observations of Ionospheric and Tropospheric Decorrelation Effects for Differential Satellite Navigation during Precision Approach," Stanford GPS Lab (Stanford, CA), p. 1–9.

Andrew J. Hansen, Todd Walter, Per Enge, "Ionospheric Correction Using Tomography," Stanford University (Stanford, CA), p. 1–9.

I. Webster, A. Kleusberg, "Regional modeling of the ionosphere for Single Frequency users of the Global Positioning System," International Symposium on Satellite Positioning (Columbus), p. 230–239, (Mar. 17, 1992).

* cited by examiner

*Primary Examiner*—Dao Phan (57) ABSTRACT

A Global Positioning System includes a ground monitoring network having a plurality of dual frequency receivers that obtain ionospheric delay measurements to provide double difference ionospheric delay residuals. These double difference delay residuals are converted to zero differences based upon a new mathematical technique. The zero differences are fit to measurement epoch specific and transmitter specific mathematical surfaces (i.e. planes). These planes represent precise ionospheric delay corrections in the area of the ground monitoring network for a specific transmitter at the measurement epoch. The planes are then provided as correction information for use by inexpensive single frequency receivers to obtain highly accurate corrections for single frequency receivers by interpolating the correction planes to the location of the single frequency receiver. With this technique higher accuracy surveying results can be achieved with low cost single frequency receivers in real-time or in post-processing than what is currently achievable even with more expensive dual frequency receivers.

13 Claims, 4 Drawing Sheets

HIGH RESOLUTION IONOSPHERIC TECHNIQUE FOR REGIONAL AREA HIGH-ACCURACY GLOBAL POSITIONING SYSTEM APPLICATIONS

RELATED APPLICATIONS

This application claims the benefit of U.S. provisional application serial No. 60/172,443 filed Dec. 17, 1999.

GOVERNMENT FUNDED INVENTION

The invention was made with Government support under Agreement No. N00014-97-1-0256 awarded by the Office of Naval Research. The Government has certain rights in this invention.

BACKGROUND OF THE INVENTION

1. Field of the Invention

The subject matter of the present invention involves systems incorporating transmitters and receivers for use in measuring the propagation time of electromagnetic signals. The systems interpret these signals to calculate a location of a receiver, e.g., a position by latitude and longitude, or to determine information about the Earth's atmospheric conditions. More specifically, the systems typically include satellite-transmitters and earth-based receivers, such as are found in the Global Positioning System, and the invention pertains to improvements in these systems for the purpose of reducing interpretation errors that result from ionospheric delays.

2. Statement of the Problem

A variety of radio positioning systems, such as the Global Positioning System (GPS), are now in use throughout the world. As used in this application, the terms "GPS" and "Global Positioning System" are used to include any positioning system that operates by the action of electromagnetic radiation, and not just the specific Global Positioning System that is operated by the United States Department of Defense. The GPS industry grosses more than a billion dollars each year in sales and service by providing reliable, quick, and accurate position measurements. Even so, there are practical limits to the precision of measurement that are obtainable from GPS systems. Traditional GPS surveys can obtain ~2 to 5 mm horizontal and ~4 to 10 mm vertical precision over 1000 km baselines. Extensive literature on the GPS and on GPS software is available.

GPS software calculates position using conventional techniques to determine distance as a function of the velocity of light and time. The calculation of true distance as a function of the velocity of light and time is complicated because the speed of light varies depending upon the content of the ionosphere, the troposphere, and other portions of Earth's atmosphere. For example, the troposphere contains localized unmodeled water vapor distributions that may affect accuracy. The ionosphere includes a blanket of electrically charged particles at an altitude of about 50 to 1500 km above the Earth. The peak electron density in the ionosphere is in the F2 layer, which exists at a height of about 400 km.

Charged ionospheric particles cause variations in the velocity of light passing through the ionosphere. The delay of GPS signals in the ionosphere is inversely proportional to the square of the carrier wave frequency, and proportional to the total number of electrons that are encountered by the GPS signal along its atmospheric traverse. Uncorrected ionospheric delay introduces significant errors into GPS calculations. Uncorrected delay effects of the ionosphere can range between 1 to 100 meters. Thus, for precise GPS applications (like mm-level surveying) ionospheric effects have to be corrected.

Signal processing techniques have been developed to correct for ionospheric variations in signal propagation time by taking advantage of the two frequencies transmitted by GPS. GPS satellites broadcast carrier signals of different frequencies, namely, L1 at 1.575 GHz and L2 at 1.227 GHz, to permit conventional calculations that eliminate ionospheric errors. Earth-based GPS receivers of better quality collect these dual signals in a conventional manner to eliminate ionospheric errors. A well know linear combination that is referred to in the art as "LC", or "L3" is formed to calculate a total propagation delay time that is free of ionospheric delay. A problem exists with this method, however, because these receivers must be dual frequency receivers at the L1 and L2 carrier frequencies and the LC linear combination is by a factor of 3 noisier than the L1 GPS data. This dual frequency requirement increases the cost of the receivers by an approximate factor of ten. Where an advanced single frequency receiver may cost about $1000, a dual frequency receiver costs about $10,000. Additionally, the increase in noise limits the accuracy that is achievable with dual frequency GPS observations.

Various solutions have been implemented in attempts to supply less expensive single frequency receivers with information to correct for ionospheric delays. These solutions typically require some form of modeling. However, all the modeling techniques that are in use fail to correct for rapidly changing or small scale ionospheric phenomena. Present ionospheric correction techniques are therefore not sufficient to permit high quality survey work with single frequency receivers over baselines of 3 km or longer.

The ionosphere may be described as a map of total electron count (TEC). These maps show the integrated number of electrons in the vertical direction as a function of geographic latitude and longitude. TEC is expressed in TEC units (TECU's). 1 TECU corresponds to $10^{16}$ electrons contained in a cylinder aligned along the line of sight with cross section of one square meter. Due to the fact that charged particles in the ionosphere are generated by the Sun and the Earth rotates under the ionosphere, TEC maps are usually represented in a Sun-fixed reference frame where the maps do not rotate but still change with time.

Solutions that permit the use of single frequency receivers include the use of dual frequency receivers to provide ionospheric maps to correct the ionospheric effect on the single frequency receiver data. Dual frequency receivers for this purpose are placed in fixed locations and provide TEC measurements in the directions of all observed GPS satellites above the horizon. These counts are scaled into the vertical direction at the ionospheric transect point. This transect point is assumed to occur at the intercept point between the site-satellite line and a shell at 350 km to 400 km above the Earth's surface. This shell height is selected because this is the approximate location of maximum electron density in the ionosphere. These scaled observations are interpolated to provide global or regional ionospheric maps depending upon the areal extent of the observation network.

By way of example, global ionospheric TEC maps are generated by the Jet Propulsion Laboratory, the University of Bern, and other sources for publication on the Internet. Regional TEC maps are generated and published on the Internet by the University Corporation for Atmospheric research, and other institutions. These maps have root mean square uncertainties of 2 to 4 TECU's (this corresponds to 0.32–0.64 cm in delay of the L1 signal), and the resolution of these maps is insufficient to accommodate many localized ionospheric disturbances.

Operationally, a single frequency GPS receiver accesses the TEC map after making a preliminary positional calculation and determining a transect point with the shell. The TEC value at the location of the transect point is read from the map and scaled into the direction of the observed GPS satellite, to correct the positional calculation for ionospheric delay. This kind of correction is referred to in the art as, using the regional or global map and the standard ionospheric correction. In the context of the present application, the network that collects data used for generating the ionospheric maps is defined as the "monitoring network" and the network that uses the correction (i.e. to improve single frequency positions) is defined as the "user network". Unfortunately, this correction is not sufficiently accurate for mm-type GPS work.

Wanninger, "Enhancing differential GPS using regional ionospheric error models," 69 Bulletin Geodesique 283–291 (1995) describes a technique to generate higher resolution ionospheric corrections based on interpolation of the ionospheric delay measured at 3 monitoring sites. The corrections described are computed at the level of double differences. Double differences are differences of the observations of two satellites as seen from two GPS receivers. Double differences are commonly formed because they allow for the highest precision GPS analysis results. The ionospheric corrections are applicable only for satellite pairs and station pairs. Thus, the technique described in Wanninger requires observations of reference satellites and reference stations. The technique also requires that baselines (differences) have to be formed between observations from the dual frequency "monitoring network" and the single frequency "user network". However, since these networks typically use different antennas and hardware, this mixing of data from the networks introduces additional errors.

For the reasons stated above, there exists a need to improve single frequency GPS calculations to be as accurate or better than dual frequency calculations by providing high quality ionospheric correction values to a user network with out the need to provide any of the "monitoring network" observations, track any specific reference satellites, or require any specific reference sites.

SOLUTION

The present invention overcomes the problems outlined above and advances the art by providing a method and apparatus that is used by single frequency GPS receivers to eliminate ionospheric delay effects without the need to provide any of the "monitoring network" observations, track any specific reference satellites, or require any specific reference sites. This advantage is realized by implementing a new zero differencing technique together with a satellite and measurement epoch-specific ionospheric model based on these zero differences.

A positioning system according to the present invention contains one or more receivers that can be operated in single frequency mode, a plurality of dual frequency receivers, a plurality of satellites or transmitters. The dual frequency receivers receive signals that are broadcast by at least four of the transmitters to provide a plurality of measurements representing ionospheric delay. A central processor connected to the monitoring network is configured to receive data from the dual frequency monitoring receivers. This processor converts the plurality of GPS measurements into ionospheric delay represented as zero differences. The single frequency receiver(s) receive signals that are broadcast by a plurality of the satellite-transmitters to provide a plurality of total delay measurements. The same or a second processor then corrects the total delay measurements for ionospheric delay through the use of the zero differences.

The manner of correction preferably includes fitting the plurality of measurements representing ionospheric delay for each satellite and at each epoch onto a mathematically defined plane surface for the location (longitude and latitude) of the single frequency receiver for the observed satellite at the observation epoch. The value of the mathematically defined plane surface at the longitude and latitude of the single receiver site identifies a value corresponding to ionospheric delay for the specific satellite at the specific epoch.

DETAILED DESCRIPTION OF THE PREFERRED EMBODIMENT

Figure 1:
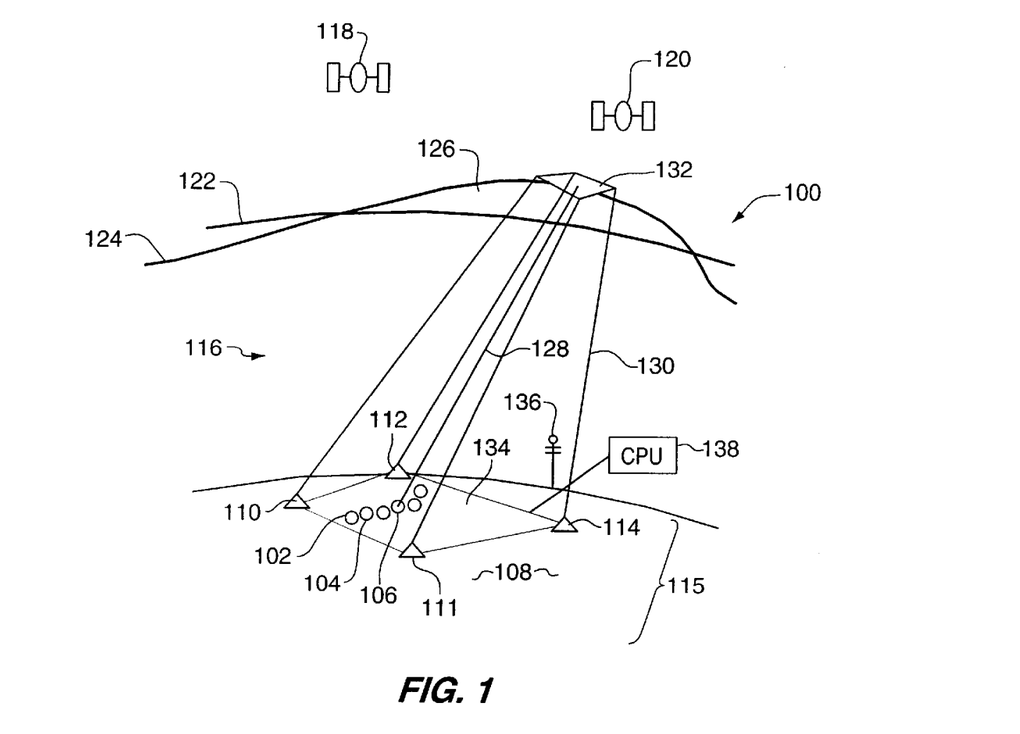
FIG. 1 depicts a system including dual frequency receivers and single frequency receivers according to the present invention.

System Hardware Implementation:

FIG. 1 depicts a high-resolution ionospheric modeling system 100 according to the present invention. A plurality of single frequency receivers 102, 104, and 106 are in use on the Earth's surface 108 to form a user network. A plurality of dual frequency receivers 110, 111, 112, and 114, are also deployed on the Earth's surface 108 to form a ground monitoring network 115. There may be any number of single frequency user receivers and dual frequency monitoring receivers in system 100, but it is preferred to have a plurality of dual frequency receivers, such as dual frequency receivers 110–114. All of these receivers including dual frequency receivers 110–114 and single frequency receivers 102–106 are used to measure signal propagation time through the Earth's atmosphere 116.

The signals are transmitted by positioning system transmitters, such as satellites 118 and 120 or a transmitter that is mounted on any other device and operably positioned to transmit through the ionosphere to the receivers on the Earth's surface 108. The satellites 118 and 120 are most preferably satellites in a Global Positioning System.

Surface 122 represents a TEC count or an ionospheric delay value that derives from a TEC map in the manner of the prior art by projecting total electron count determined from a large network of dual frequency receivers at L1 and L2, as described above. The height of this surface above the surface of the Earth 108 is meant to represent the TEC count.

Surface 124 represents an actual TEC count or an actual value for ionospheric delay. The height of surface 124 represents the magnitude of an actual observed value that could be measured from actual line of sight observations between dual frequency receivers 110–114 and a selected satellite, e.g. satellite 120.

Differences between the magnitude of respective values assigned to surface 122 and surface 124, e.g. as in region 126 where the respective values separate, represent the magnitude of ionospheric error that this invention corrects. The magnitude of this error can be determined based on the zero difference residuals of the monitoring site observations. The problem of residuals is known in the prior art, but prior systems are unable to determine zero difference phase residuals for ionospheric correction of single frequency observations.

Surface 124 is idealized to the extent that the actual values, while they do exist, cannot be directly measured over the entire extent of the Earth's surface 108 due to the limited area covered by the orbit of satellite 120 and other satellites. The values of surface 124 can be measured only where the line-of-sight from a dual frequency receiver to a GPS satellite transects the surface. The inability to perform direct measurements of ionospheric delay at single frequency receivers 102–106 necessitates the use of mapping or interpolation techniques to assign values that are accessible to the single frequency receivers 102–106.

Each of the single frequency receivers 102–106 has a line-of-sight to each satellite under observation, just as single frequency receiver 106 has a line-of-sight 128 to satellite 120. Similarly, each of the dual frequency receivers 110–114 has a line-of-sight to each satellite under observation, just as dual frequency receiver 114 has a line of sight 130 to satellite 120. These lines-of-sight can be used to project a surface, such as a plane 132 or curved surface, any distance over the observation area 134. Ionospheric delay values corresponding to line-of-sight ionospheric delay measurements between dual frequency receivers 110–114 and satellite 120 are assigned to the points defining plane 132 and interpolated across the surface of the plane to establish delay values across the entire surface of the plane 132. These values closely approximate the actual observed ionospheric delay value 124 over the observation area 134.

The line-of-sight 128 between single frequency receiver 106 and satellite 120 transects plane 132 at a point corresponding to an ionospheric delay value from the point of observation assigned to single frequency receiver 106 at its vantage point on the Earth's surface 108. This technique provides enhanced resolution, especially where the dual frequency receivers 110–114 are spaced no farther apart than ~100 km. For separation distances exceeding about 100 km, the inherent accuracy of the plane interpolation technique begins to degrade due to ionospheric irregularities and an increase in the distance between dual frequency receivers in the ground monitoring network 115. The quality of corrections provided will slowly degrade with increasing separation of the monitoring sites. System 100 includes a CPU 138, which is used to calculate zero difference values for ionospheric delay residuals using measurements obtained from the dual frequency ground monitoring network 115. The technique of calculating zero differences will be discussed below in greater detail. A broadcast station 136 distributes the processed information for use by the single frequency receivers 102–106.

Figure 2:
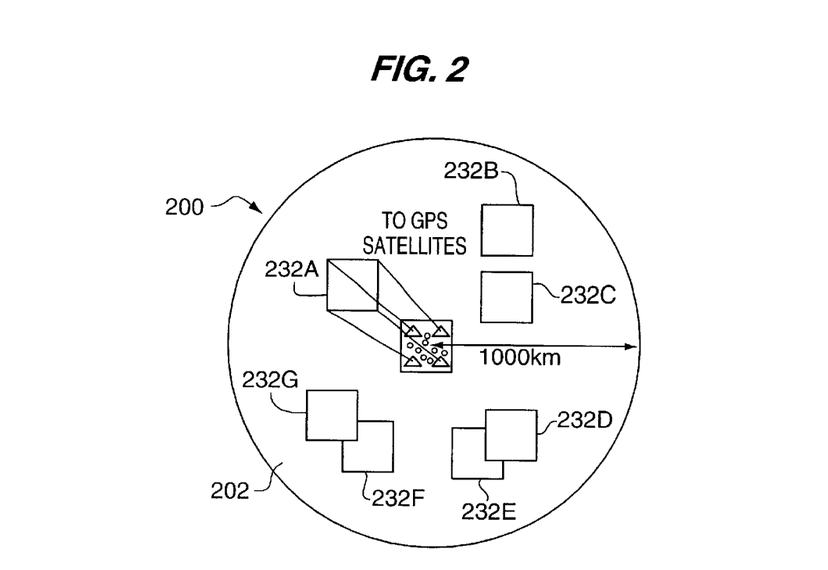
FIG. 2 is a top view looking down at the ionospheric shell at a system like the one shown in FIG. 1, where squares indicate which areas of the ionosphere are observed by the monitoring sites at a specific epoch.

FIG. 2 depicts the same as FIG. 1 but viewed from above the ionospheric shell. This figure illustrates projections of the monitoring network onto the ionospheric shell. Correction values are provided only for these small regions (the same size as the monitoring network) rather than for the entire ionosphere over which TEC maps are provided by conventional means.

These regions 232a–232g are areas of the ionosphere that are mapped much more precise and focused where the user network needs them compared to traditional maps, that provide coarse TEC correction values everywhere in region 200. The rays from the user stations to the GPS satellites all transect the ionosphere in the regions 232a–232g where accurate corrections are obtained based on the zero differences from the monitoring sites. In addition, the system employs a radically new approach to signal processing using zero differences while still taking advantage of all the benefits of double difference processing of the data from the monitoring network.

Figure 3:
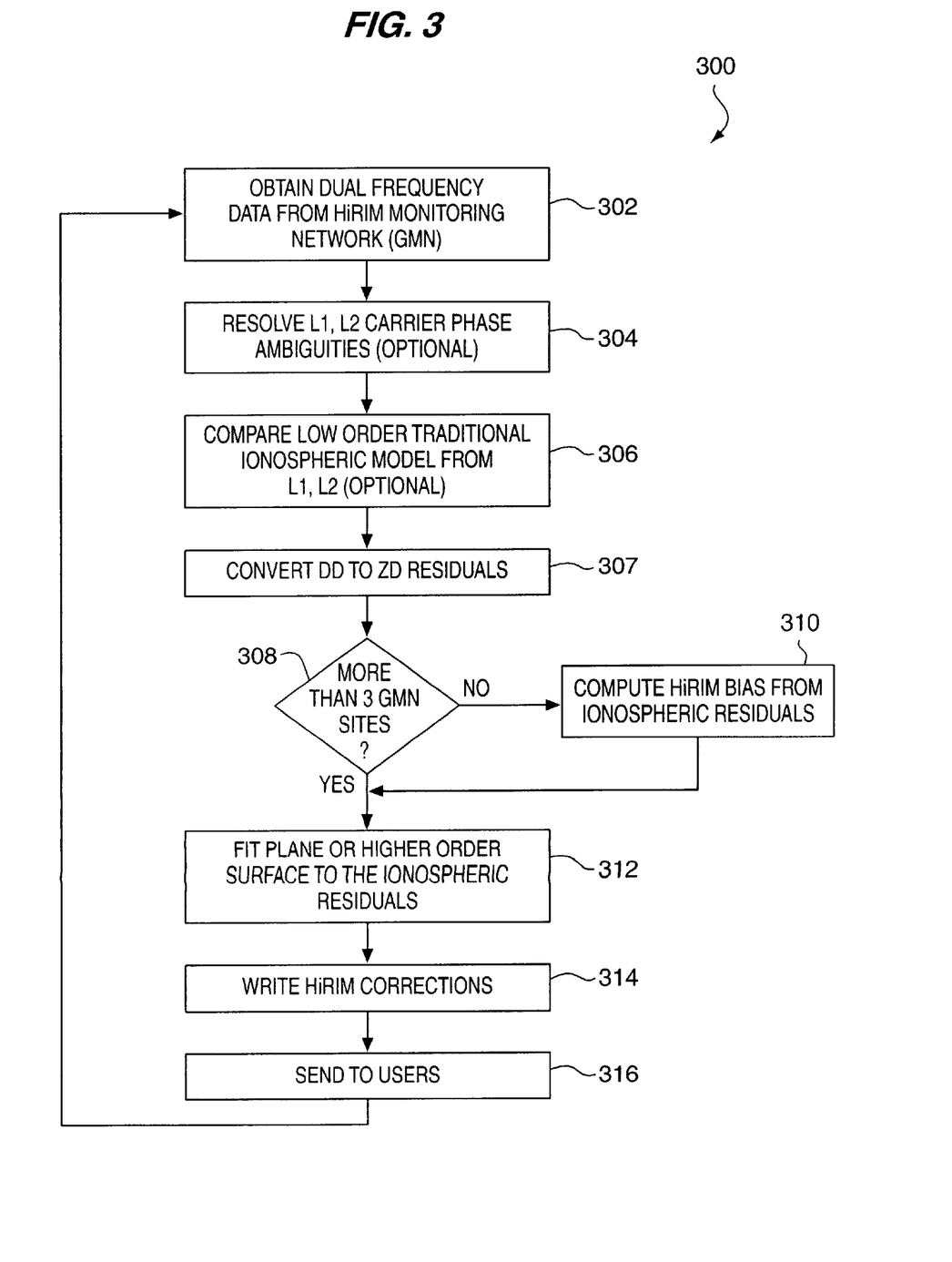
FIG. 3 is a schematic process diagram showing signal processing of dual frequency data from a ground monitoring network for the purpose of calculating zero difference ionospheric delay residuals and projecting the same onto a plane.

Processing of Dual Frequency Data At the Ground Monitoring Network:

FIG. 3 is a schematic process diagram showing a process 300 for use in processing signals from system 100 by CPU 134 (see also FIG. 1). The underlying dual frequency data must be transmitted to a processing center, such as CPU 134. The process is performed for each epoch where an epoch comprises an observation window of fixed time and duration, e.g. a thirty-second epoch. This ability to repeat the process at rapid intervals enhances the system performance by rapidly updating model input including observed ionospheric delay values.

Step 302 entails obtaining dual frequency data from the ground monitoring network 115 that is formed of dual frequency receivers, e.g. receivers 110–114 (see also FIG. 1). The L1 and L2 carrier signals are converted by conventional methods into values representing ionospheric delays, e.g. TECU's. Step 304 is an optional step that includes the resolution of carrier phase ambiguities by conventional methods.

Step 306 includes the computation of a low order ionospheric model by conventional methods. These models are of the type published for distribution on the Internet by the Jet Propulsion Laboratories and various universities. A model may be computed according to traditional methods using L1 and L2 signals received at the ground monitoring network comprised of dual frequency receivers 110–114, or less timely data may be obtained from another source.

The computation of this ionospheric model in step 306 is optional. Alternatively one could use a predicted model from another source or not compute a model at all. It should be noted, however, that if no model is computed at all, the residuals of the process will be larger. Where step 306 is preformed by modeling or another source, step 307 entails converting the residuals from step 306 from the double difference to zero difference level with a new mathematical technique described below.

Figure 4:
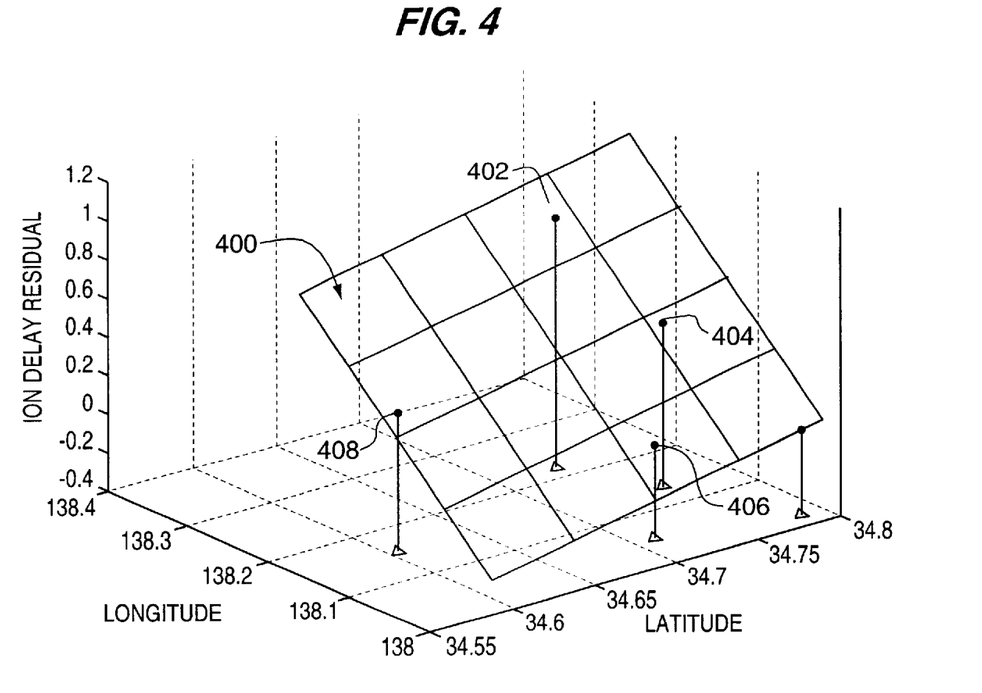
FIG. 4 is a plot showing a projected plane containing ionospheric delay residuals as a function of latitude and longitude, as produced by the process of FIG. 3.

In step 308, a decision is made depending upon whether there are at least three active dual frequency ground receivers in the ground-monitoring network 115. Where there are not at least three active dual frequency receivers, there are insufficient points to define a sloped plane, and residuals are then used according to step 310, which calculates the zero difference ionospheric delay as the average of the zero difference residuals for the given satellite and epoch. This calculation is, in effect, a bias correction that will be the same for the entire user network.

Where there are at least three active dual frequency receivers in the ground monitoring network 115, the zero difference residuals are fitted to a plane in step 312. FIG. 4 depicts a plane 400 of this type where the zero difference ion delay residual is expressed as a function of latitude and longitude. Points 402, 404, 406, and 408 correspond to the latitude and longitude coordinates of dual frequency receivers in the ground-monitoring network 115.

Step 314 includes writing or storing the zero difference ionospheric delay residual data in the form of such planes as computed in step 312, and step 316 entails sending this data to users through broadcast station 136 or other means. Process 300 repeats itself to rebroadcast information at periodic intervals. The corrections can also be made available for post processing needs.

Figure 5:
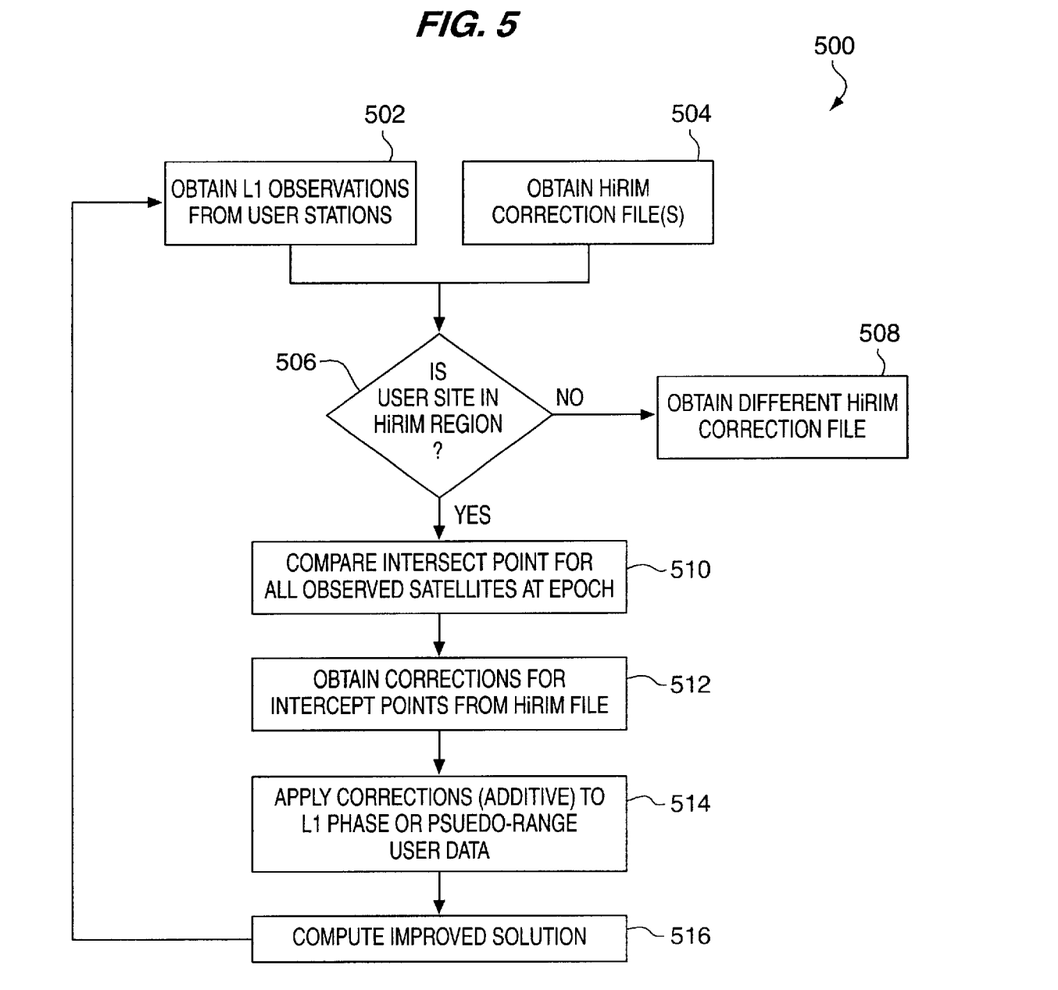
FIG. 5 is a schematic process diagram showing processing of single frequency information at the L1 frequency with supplementation by ionospheric delay residual values that have been created by the process shown in FIG. 3.

Processing of Single Frequency Data:

FIG. 5 is a schematic process diagram showing a process 500 for use at any one of the single frequency receivers 102–106 in system 100 (see also FIG. 1). It is also possible for the single frequency receivers 102–106 to store information for post processing by CPU 138 or to broadcast measurement information for processing by CPU 138 or another processor.

Step 502 entails obtaining single frequency observations, which are normally L1 frequency GPS observations. In step 504, the single frequency receiver obtains the correction data that is sent to users, i.e. data that is sent as shown in step 316 of FIG. 3.

The single frequency receiver performs a conventional position calculation and uses this fix to determine whether it is located within the confines of a particular ground monitoring network at an epoch, such as network 115, all in step 506. If not, in step 508, the single frequency receiver receives and stores a different correction file corresponding to the network where the receiver is now located. Once the proper correction file is located, the single frequency receiver uses the data contained in the file to calculate intersect points for all observed satellites at the epoch (step 510). Together with the ionospheric correction value of step 512 this represents the value of the plane for the longitude and latitude coordinates of the user site, which is interpolated from the data resulting from step 316.

These corrections are applied by addition in step 514 to modify the observed L1 phase or pseudorange observations for each satellite. An improved or corrected position is calculated in step 516 using the corrected values from step 514.

Technique of Zero Difference Calculation:

Inversion for Single, Delta, and Zero Differences Using Double Differences

Let $\phi_1^A$ and $\phi_2^A$ be observations by receiver A and on satellites 1 and 2, and $\phi_1^B$ and $\phi_2^B$ be observations by receiver B on satellites 1 and 2. Single and double differences may be formed from these four observations. For example, The two single differences $S_1^{AB}$ and $S_2^{AB}$ are expressed as, $$S_1^{AB} = \phi_1^A - \phi_1^B \quad (1)$$

$$S_2^{AB} = \phi_2^A - \phi_2^B$$

The GPS satellite clock error and satellite orbit error cancels in single differences, since these errors are common to all simultaneous observations of a given satellite. Next, a double difference $dd_{12}^{AB}$ is calculated as $$dd_{12}^{AB} = (\phi_1^A - \phi_1^B) - (\phi_2^A - \phi_2^B) = S_1^{AB} - S_2^{AB}, \quad (2)$$

which can be written as the difference of the two single differences.

The effects on GPS observations that cancel in double differencing are station dependent common-mode effects. They include the common observation components due to receiver clocks, homogeneous atmospheric delay, and site coordinates. Site coordinate errors and inhomogeneous atmospheric delay differences do not cancel. The following disclosure relates to how double difference residuals are used to first obtain single difference residuals and then zero difference residuals after the site coordinates, zenith tropospheric delays, carrier phase ambiguities, and ionospheric delays have been computed.

In order to obtain single differences from double differences, the double differences (dd) can be written as the product of a matrix D and a vector of single differences s, according to Equation (3).

$$Ds = dd. \quad (3)$$

The single differences can then be found by inverting the D matrix according to Equation (4).

$$s = D^{-1} dd \quad (4)$$

If there are N single differences, then only N−1 linearly independent double differences can be formed, and the D matrix cannot be inverted. Nevertheless, if we add a constraint on at least one of the single differences, as shown in Equation (5), then D has a well defined inverse and we can solve for single differences using double differences.

$$\begin{bmatrix} w_1 w_2 \ldots w_n \\ 1 \; -1 \ldots 0 \ldots 0 \\ \ldots \\ 1 \ldots 0 \ldots 0 \ldots -1 \end{bmatrix} \begin{bmatrix} s_1^{IJ} \\ s_2^{IJ} \\ s_3^{IJ} \\ \ldots \\ s_n^{IJ} \end{bmatrix} = \begin{bmatrix} w_1 s_1^{IJ} \ldots + w_n s_n^{IJ} \\ s_1^{IJ} - s_2^{IJ} \\ s_1^{IJ} - s_3^{IJ} \\ \ldots \\ s_1^{IJ} - s_n^{IJ} \end{bmatrix} \quad (5)$$

$$= \begin{bmatrix} \sum w_i s_i^{IJ} \\ dd_{12}^{IJ} \\ dd_{13}^{IJ} \\ \ldots \\ dd_{1n}^{IJ} \end{bmatrix}$$

The additional condition is expressed in the top row as a weighted sum of single differences between sites I and J to all satellites observed at one observation epoch. The summation is taken over a number of satellites up to all satellites that are in view at sites I and J.

If we model all the effects on the GPS observations and use the double difference residuals shown in Equation (5), then setting the sum $\Sigma w_i s_i^{IJ}$ equal to zero produces single difference residuals representing the fluctuations about the model used to obtain the double differences. Errors introduced by unmodeled effects, such as multipath or large tropospheric inhomogeneities can be minimized by downweighting the low elevation and anomalously affected single differences which are used for the constraint in Equation (5).

The single differences with $w_i \neq 0$, referred to as the reference single differences, are chosen such that the weighted sum can be modeled as accurately as possible. The effects of random errors are minimized by choosing a large set of reference single differences. The effects of systematic errors are minimized by weighting more heavily those single differences least affected by the systematic effects. For example, in preferred embodiments, low elevation effects are prevented from affecting the single differences that are obtained for satellites at higher elevations, by setting $w_i=0$ for the satellites below a delimiting elevation value, and $w_i=1$ for the satellites at higher elevations.

We obtain zero differences using the single differences for a given satellite (i) from all of the site pairs (I,J) in the GPS network. Starting with Equation (6), $$D_i^{IJ} z_i = s_i^{IJ}, \quad (6)$$

where $D_i$ is a matrix operating on a vector of zero differences for the i'th satellite, $z_i$, to produce the vector of single differences $s_i^{IJ}$, we obtain a form for $D_i$ which has an inverse by including a constraint on the zero differences. As shown in Equation (7).

$$\begin{bmatrix} w^A w^B w^C \ldots w^Z \\ 1 \ldots -1 \ldots 0 \ldots 0 \\ 0 \ldots 1 \ldots -1 \ldots 0 \\ \ldots \\ 1 \ldots 0 \ldots 0 \ldots -1 \end{bmatrix} \begin{bmatrix} z_i^A \\ z_i^B \\ z_i^C \\ \ldots \\ z_i^Z \end{bmatrix} = \begin{bmatrix} w^A z_i^A + \ldots + w^Z z_i^Z \\ z_i^A - z_i^B \\ z_i^B - z_i^C \\ \ldots \\ z_i^A - z_i^Z \end{bmatrix} \quad (7)$$

$$= \begin{bmatrix} \sum w^I z_i^I \\ s_i^{AB} \\ s_i^{BC} \\ \ldots \\ s_i^{AZ} \end{bmatrix}$$

where $w^I$ is the weighting for the i'th satellite at the I'th site, and the sum $\Sigma W^I Z_i^I$ is the sum of the single path effects to the i'th satellite from each site. As before, we can downweight the low elevation and anomalously affected zero differences used in the constraint. As long as at least one of the zero differences is constrained, $D_i$ can be inverted. The constraint may come from another sources such as a water vapor radiometer and/or barometer. If we assume that the sum $\Sigma w^I z_i^I$ equals zero, we can obtain zero differences that represent the slant delay fluctuations about the model used to obtain the double and single differences.

For tropospheric slant delays, assuming the sum is zero, means that the residual delay in the direction on one GPS satellite, at each epoch, averaged over the entire GPS network, is equal to zero. For a GPS network that is distributed over a large area (~100 km), this assumption is generally good because the distribution of water vapor at the sites can be considered random. For a small network, if one satellite is observed through the same weather system from all stations, then the delay is common mode, and it cannot be resolved. To obtain absolute slant delays using small networks, one could use the slant delay observations from a single radiometer pointing at all the GPS satellites to constrain the zero differences.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

We claim:

1. A method of processing signals in a positioning system incorporating transmitters and receivers to correct said signals for ionospheric delays, said method comprising the steps of:
    receiving signals broadcast by at least one of said transmitters to provide a plurality of measurements representing ionospheric delay;
    converting said plurality of measurements representing ionospheric delay into zero differences;
    receiving signals broadcast by a plurality of said transmitters to provide a plurality of total delay measurements;
    correcting said total delay measurements for ionospheric delay by use of said zero differences.

2. The method according to claim 1 wherein said step of correcting said total delay measurements includes fitting said plurality of measurements representing ionospheric delay onto a mathematically defined surface superimposed over an observation area.

3. The method according to claim 2 wherein said step of correcting said delay measurements includes projecting a line between said receiver operating in single frequency mode and a satellite to intersect said mathematically defined surface superimposed over said observation area, where intersection of said line and said mathematically defined surface identifies a value corresponding to ionospheric delay.

4. The method according to claim 1 wherein said positioning system includes a plurality of transmitters which are used in said step of receiving signals broadcast by at least one of said transmitters, and said zero differences comprise zero differences based upon single differences.

5. The method according to claim 1 wherein said positioning system includes a plurality of receivers used in said step of receiving signals broadcast by at least one of said transmitters, and said zero differences comprise zero differences based upon double differences.

6. The method according to claim 1 wherein said positioning system includes a plurality of receivers and a plurality of transmitters used in said step of receiving signals broadcast by at least one of said transmitters, and said zero differences comprise zero differences based upon a combination of single differences and double differences.

7. The method according to claim 1 wherein said step of converting said plurality of measurements includes converting said measurements without having to refer back to the ground monitoring network to provide a reference point constraint.

8. A positioning system having an improved capacity for correcting single frequency position measurements for ionospheric delay effects, comprising:
    a ground monitoring network of multiple frequency receivers configured to receive signals broadcast by at least one transmitter to provide a plurality of measurements representing ionospheric delay;
    a processor operably configured with program instructions to convert said plurality of measurements representing ionospheric delay into zero differences;
    at least one single frequency receiver configured to receive signals broadcast by a plurality of total propagation delay measurements; and
    a processor configured to correct said total propagation delay measurements for ionospheric delay by use of said zero differences.

9. The system as set forth in claim 8 wherein said processor configured to correct said total propagation delay measurements includes means for fitting said plurality of measurements representing ionospheric delay onto a mathematically defined surface superimposed over an observation area.

10. The system as set forth in claim 9 wherein said processor configured to correct said total propagation delay measurements includes means for projecting a line between said receiver operating in single frequency mode and a satellite to intersect said mathematically defined surface superimposed over said observation area, where intersection of said line and said mathematically defined surface identifies a value corresponding to ionospheric delay.

11. The system as set forth in claim 8 wherein said positioning system includes a plurality of receivers and transmitters which provide transmissions to said ground monitoring network, and said zero differences comprise zero differences based upon single differences.

12. The system as set forth in claim 8 wherein said positioning system includes a plurality of receivers and a plurality of transmitters, and said zero differences comprise zero differences based upon a combination of single differences and double differences.

13. The system as set forth in claim 8 wherein said step of converting said plurality of measurements includes converting said measurements without having to refer back to the ground monitoring network to provide reference observations.

* * * * *